(12) United States Patent
Nystad

(10) Patent No.: US 10,176,546 B2
(45) Date of Patent: Jan. 8, 2019

(54) DATA PROCESSING SYSTEMS

(71) Applicant: ARM Limited, Cambridge (GB)

(72) Inventor: Jorn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 232 days.

(21) Appl. No.: 13/933,612

(22) Filed: Jul. 2, 2013

(65) Prior Publication Data
US 2014/0354644 A1 Dec. 4, 2014

(30) Foreign Application Priority Data
May 31, 2013 (GB) .................................. 1309765.4

(51) Int. Cl.
*G06T 1/20* (2006.01)
*G06F 9/30* (2018.01)
*G06T 15/00* (2011.01)

(52) U.S. Cl.
CPC .............. *G06T 1/20* (2013.01); *G06F 9/30* (2013.01); *G06T 15/005* (2013.01); *G06T 2210/52* (2013.01)

(58) Field of Classification Search
CPC ........... G06T 1/20; G06T 15/005; G06T 1/60; G06T 2210/52; G06T 15/80; G06F 9/3857; G06F 9/3855; G06F 9/3838; G06F 9/3867; G06F 9/3885; G06F 9/3836; G06F 9/30; G06F 9/30079; G06F 9/30061;
(Continued)

(56) References Cited

U.S. PATENT DOCUMENTS 5,021,945 A * 6/1991 Morrison et al. ............. 712/216
5,202,975 A * 4/1993 Rasbold .................... G06F 8/41
711/E12.006
(Continued)

FOREIGN PATENT DOCUMENTS

CN  1945536 A  4/2007
CN  101620527 A  1/2010
(Continued)

OTHER PUBLICATIONS

GB Search Report dated Nov. 27, 2013, GB Patent Application No. GB1309765.4.
(Continued)

*Primary Examiner* — Devona E Faulk
*Assistant Examiner* — Charles L Beard
(74) *Attorney, Agent, or Firm* — Vierra Magen Marcus LLP

(57) ABSTRACT

A data processing system determines for a stream of instructions to be executed, whether there are any instructions that can be re-ordered in the instruction stream 41 and assigns each such instruction to an instruction completion tracker and includes in the encoding for the instruction an indication of the instruction completion tracker it has been assigned to 42. For each instruction in the instruction stream, an indication of which instruction completion trackers, if any, the instruction depends on is also provided 43, 44. Then, when an instruction that is indicated as being dependent on an instruction completion tracker is to be executed, the status of the relevant instruction completion tracker is checked before executing the instruction.

18 Claims, 7 Drawing Sheets

(58) Field of Classification Search
CPC .. G06F 9/30058; G06F 9/30054; G06F 9/321; G06F 9/3844
See application file for complete search history.

(56) References Cited

U.S. PATENT DOCUMENTS

| | | | | |
|---|---|---|---|---|
| 5,450,560 A * | 9/1995 | Bridges | G06F 5/10 | 708/211 |
| 5,488,729 A * | 1/1996 | Vegesna | G06F 9/30112 | 712/209 |
| 5,497,499 A * | 3/1996 | Garg | G06F 9/3013 | 712/217 |
| 5,542,059 A * | 7/1996 | Blomgren | G06F 9/30043 | 710/240 |
| 5,542,075 A * | 7/1996 | Ebcioglu | G06F 8/445 | 712/225 |
| 5,548,738 A * | 8/1996 | Song | G06F 9/3836 | 710/260 |
| 5,559,976 A * | 9/1996 | Song | G06F 9/3836 | 712/215 |
| 5,584,037 A * | 12/1996 | Papworth | G06F 5/14 | 712/23 |
| 5,627,981 A * | 5/1997 | Adler | G06F 8/443 | 712/235 |
| 5,649,225 A * | 7/1997 | White | G06F 9/30032 | 712/1 |
| 5,699,536 A * | 12/1997 | Hopkins | G06F 9/30061 | 712/203 |
| 5,761,515 A * | 6/1998 | Barton, III | G06F 8/4442 | 711/118 |
| 5,822,556 A * | 10/1998 | Potter | G06F 9/3836 | 712/205 |
| 5,838,940 A * | 11/1998 | Savkar | G06F 9/3802 | 712/200 |
| 5,870,616 A * | 2/1999 | Loper | G06F 1/32 | 711/128 |
| 5,911,057 A * | 6/1999 | Shiell | G06F 9/3824 | 712/217 |
| 5,918,005 A * | 6/1999 | Moreno | G06F 9/3834 | 712/E9.048 |
| 5,928,334 A * | 7/1999 | Mandyam | G06F 9/52 | 709/248 |
| 5,937,191 A * | 8/1999 | Graham | | 717/130 |
| 5,938,760 A * | 8/1999 | Levine | G06F 11/3409 | 712/215 |
| 5,961,654 A * | 10/1999 | Levine | G06F 11/3409 | 714/37 |
| 6,044,222 A * | 3/2000 | Simons | G06F 8/4452 | 712/207 |
| 6,044,450 A * | 3/2000 | Tsushima | G06F 9/30025 | 712/215 |
| 6,112,019 A * | 8/2000 | Chamdani | G06F 9/3836 | 712/214 |
| 6,139,199 A * | 10/2000 | Rodriguez | G06F 8/445 | 712/214 |
| 6,189,072 B1 * | 2/2001 | Levine | G06F 11/3409 | 702/182 |
| 6,189,088 B1 * | 2/2001 | Gschwind | G06F 8/445 | 712/216 |
| 6,247,114 B1 * | 6/2001 | Trull | G06F 9/3802 | 712/202 |
| 6,260,191 B1 * | 7/2001 | Santhanam | G06F 8/423 | 717/114 |
| 6,351,805 B2 * | 2/2002 | Janik | | 712/218 |
| 6,425,072 B1 * | 7/2002 | Meier | G06F 9/3836 | 712/218 |
| 6,463,579 B1 * | 10/2002 | McKinsey | G06F 8/433 | 717/145 |
| 6,487,715 B1 * | 11/2002 | Chamdani | G06F 8/445 | 712/214 |
| 6,487,716 B1 * | 11/2002 | Choi | G06F 8/443 | 712/244 |
| 6,499,116 B1 * | 12/2002 | Roth | G06F 9/30047 | 711/146 |
| 6,530,042 B1 * | 3/2003 | Davidson et al. | | 714/47.1 |
| 6,539,502 B1 * | 3/2003 | Davidson et al. | | 714/47.1 |
| 6,550,002 B1 * | 4/2003 | Davidson et al. | | 712/216 |
| 6,574,727 B1 * | 6/2003 | Davidson et al. | | 712/227 |
| 6,591,342 B1 * | 7/2003 | Akkary | G06F 9/3824 | 711/125 |
| 6,636,950 B1 * | 10/2003 | Mithal | G06F 9/3004 | 711/117 |
| 6,651,163 B1 * | 11/2003 | Kranich | G06F 9/3004 | 712/220 |
| 6,654,869 B1 * | 11/2003 | Kahle | G06F 9/382 | 712/209 |
| 6,697,932 B1 * | 2/2004 | Yoaz | G06F 9/3824 | 712/216 |
| 6,988,183 B1 * | 1/2006 | Wong | G06F 9/30174 | 712/208 |
| 7,159,101 B1 * | 1/2007 | Thekkath | G06F 9/3836 | 712/218 |
| 7,200,723 B1 * | 4/2007 | Ansari | G06F 9/30145 | 711/154 |
| 7,293,159 B2 * | 11/2007 | Doering | G06F 9/30079 | 712/32 |
| 7,330,962 B2 * | 2/2008 | Ludwig et al. | | 712/214 |
| 7,373,484 B1 * | 5/2008 | Radhakrishnan et al. | | 712/217 |
| 7,434,030 B2 * | 10/2008 | Irie | G06F 9/30134 | 712/209 |
| 7,450,131 B2 * | 11/2008 | Swamy et al. | | 345/565 |
| 7,530,062 B2 * | 5/2009 | Aronson et al. | | 717/159 |
| 7,624,255 B1 * | 11/2009 | Rouet et al. | | 712/220 |
| 7,650,487 B2 * | 1/2010 | Chaudhry et al. | | 712/220 |
| 7,849,292 B1 * | 12/2010 | Ashcraft | G06F 9/3017 | 712/220 |
| 7,853,756 B2 * | 12/2010 | Ukai | G06F 9/3004 | 711/141 |
| 7,924,860 B1 * | 4/2011 | Frailong | H04L 49/552 | 370/413 |
| 7,937,564 B1 * | 5/2011 | Ashcraft | G06F 9/3017 | 712/216 |
| 7,958,316 B2 * | 6/2011 | Speight | G06F 12/0862 | 711/137 |
| 8,127,114 B2 * | 2/2012 | Seth | G06F 9/3836 | 712/214 |
| 8,141,068 B1 * | 3/2012 | Thompson | G06F 8/433 | 717/151 |
| 8,159,491 B2 * | 4/2012 | Capewell | G06T 15/005 | 345/426 |
| 8,498,306 B2 * | 7/2013 | Frailong | H04L 49/552 | 370/413 |
| 8,595,688 B1 * | 11/2013 | Greive | G06F 8/76 | 717/106 |
| 8,689,199 B2 * | 4/2014 | Aronson | G06F 8/4434 | 717/154 |
| 8,832,324 B1 * | 9/2014 | Hodges | G06F 13/1642 | 710/120 |
| 8,866,827 B2 * | 10/2014 | Zhou et al. | | 345/522 |
| 8,977,815 B2 * | 3/2015 | Heggelund | | 711/118 |
| 9,024,957 B1 * | 5/2015 | Mahan et al. | | 345/538 |
| 9,026,769 B1 * | 5/2015 | Jamil | G06F 9/3855 | 712/214 |
| 9,054,998 B2 * | 6/2015 | Jokinen | H04L 47/62 | |
| 9,276,868 B2 * | 3/2016 | Shumsky | H04L 49/552 | |
| 9,317,298 B2 * | 4/2016 | Greive | G06F 8/76 | |
| 9,323,678 B2 * | 4/2016 | Kumar | G06F 13/14 | |
| 9,479,620 B2 * | 10/2016 | Levy | H04L 45/745 | |
| 9,513,922 B2 * | 12/2016 | Palalau | G06F 8/4441 | |
| 9,529,643 B2 * | 12/2016 | Raman | G06F 9/52 | |
| 9,558,000 B2 * | 1/2017 | Glossner | G06F 9/3851 | |
| 9,571,541 B1 * | 2/2017 | Bishara | H04L 49/201 | |
| 9,766,894 B2 * | 9/2017 | Glossner | G06F 9/3822 | |
| 9,807,027 B2 * | 10/2017 | Shumsky | H04L 47/624 | |
| 9,928,069 B2 * | 3/2018 | Gonion | G06F 9/3838 | |
| 10,061,584 B2 * | 8/2018 | Burger | G06F 9/3004 | |
| 10,061,705 B2 * | 8/2018 | Gschwind | G06F 9/30101 | |
| 2002/0066003 A1 * | 5/2002 | Nevill | G06F 9/30101 | 712/209 |

(56) References Cited

U.S. PATENT DOCUMENTS

| | | | |
|---|---|---|---|
| 2002/0066004 A1* | 5/2002 | Nevill | G06F 9/30 712/209 |
| 2002/0083302 A1* | 6/2002 | Nevill | G06F 9/30101 712/209 |
| 2002/0087955 A1* | 7/2002 | Ronen | G06F 9/3001 717/151 |
| 2002/0199087 A1* | 12/2002 | Seal | G06F 9/45504 712/227 |
| 2003/0005422 A1* | 1/2003 | Kosche | G06F 8/4451 717/154 |
| 2003/0074655 A1* | 4/2003 | Robison | G06F 8/434 717/162 |
| 2003/0149862 A1* | 8/2003 | Kadambi | G06F 9/3838 712/217 |
| 2003/0161303 A1* | 8/2003 | Mehrvar | H04L 47/24 370/386 |
| 2003/0167458 A1* | 9/2003 | Santhanam | G06F 8/41 717/114 |
| 2003/0196197 A1* | 10/2003 | Fu | G06F 8/445 717/161 |
| 2003/0200539 A1* | 10/2003 | Fu | G06F 8/445 717/161 |
| 2003/0200540 A1* | 10/2003 | Kumar | G06F 8/433 717/161 |
| 2004/0025151 A1* | 2/2004 | Ku | G06F 8/4441 717/159 |
| 2004/0025152 A1* | 2/2004 | Ishizaki et al. | 717/159 |
| 2004/0054993 A1* | 3/2004 | Nair | G06F 9/45504 717/138 |
| 2004/0059898 A1* | 3/2004 | Baxter | G06F 9/3017 712/235 |
| 2004/0194076 A1* | 9/2004 | Comp | G06F 8/443 717/158 |
| 2004/0215936 A1* | 10/2004 | Ambekar | G06F 9/3838 712/217 |
| 2004/0225869 A1* | 11/2004 | Pagni | G06F 9/30098 712/227 |
| 2004/0237074 A1* | 11/2004 | Aronson et al. | 717/158 |
| 2004/0261068 A1* | 12/2004 | Ju | G06F 9/3834 717/159 |
| 2004/0268098 A1* | 12/2004 | Almog | G06F 9/3808 712/227 |
| 2005/0034111 A1* | 2/2005 | Martin | G06F 8/4452 717/141 |
| 2005/0081195 A1* | 4/2005 | Chaudhry | G06F 9/3836 717/154 |
| 2005/0120192 A1* | 6/2005 | Akkary | G06F 9/384 712/220 |
| 2005/0125476 A1* | 6/2005 | Symes | G06F 9/30014 708/524 |
| 2005/0125786 A1* | 6/2005 | Dai | G06F 8/4451 717/161 |
| 2005/0172103 A1* | 8/2005 | Inuo | G06F 9/30036 712/10 |
| 2005/0183072 A1* | 8/2005 | Horning | G06F 21/14 717/140 |
| 2005/0251654 A1* | 11/2005 | Altman | G06F 9/30036 712/214 |
| 2005/0268293 A1* | 12/2005 | Kawahito | G06F 8/4434 717/154 |
| 2005/0273580 A1* | 12/2005 | Chaudhry | G06F 9/3842 712/218 |
| 2005/0283588 A1* | 12/2005 | Yamashita | G06F 9/3808 712/217 |
| 2005/0289246 A1* | 12/2005 | Easton | G06F 12/109 710/1 |
| 2006/0048111 A1* | 3/2006 | Archambault | G06F 8/443 717/144 |
| 2007/0011440 A1* | 1/2007 | Niitsuma | G06F 9/384 712/217 |
| 2007/0070075 A1* | 3/2007 | Hsu | G06T 15/005 345/559 |
| 2007/0074196 A1* | 3/2007 | Ogawa | G06F 8/445 717/160 |
| 2007/0076010 A1* | 4/2007 | Swamy et al. | 345/565 |
| 2007/0079305 A1* | 4/2007 | Duerinckx | G06F 8/445 717/151 |
| 2007/0089095 A1* | 4/2007 | Thekkath | G06F 9/3836 717/128 |
| 2007/0094639 A1* | 4/2007 | Kefford et al. | 717/110 |
| 2007/0113223 A1* | 5/2007 | Ludwig et al. | 717/161 |
| 2007/0150248 A1* | 6/2007 | Chiou | G06F 17/5022 703/13 |
| 2007/0220235 A1* | 9/2007 | Yehia | G06F 9/3802 712/205 |
| 2007/0277162 A1* | 11/2007 | Tanaka | G06F 8/4441 717/140 |
| 2008/0028183 A1* | 1/2008 | Hwu | G06F 9/3836 712/20 |
| 2008/0040590 A1* | 2/2008 | Lee | G06F 9/30094 712/238 |
| 2008/0077778 A1* | 3/2008 | Davis | G06F 9/30105 712/217 |
| 2008/0084424 A1* | 4/2008 | Hsu | G06T 1/20 345/522 |
| 2008/0098207 A1* | 4/2008 | Reid | G06F 11/362 712/227 |
| 2008/0133888 A1* | 6/2008 | Arakawa | G06F 9/30105 712/214 |
| 2008/0148282 A1* | 6/2008 | Sodani | G06F 9/3865 719/314 |
| 2008/0162884 A1* | 7/2008 | Kailas | G06F 9/3808 712/214 |
| 2008/0244234 A1* | 10/2008 | Seth | G06F 9/3836 712/219 |
| 2008/0259928 A1* | 10/2008 | Chen | H04L 49/90 370/394 |
| 2008/0276076 A1* | 11/2008 | Abernathy et al. | 712/217 |
| 2008/0294881 A1* | 11/2008 | Chen et al. | 712/227 |
| 2009/0002379 A1* | 1/2009 | Baeza | G06T 1/20 345/522 |
| 2009/0049434 A1* | 2/2009 | Kawano | G06F 8/4441 717/149 |
| 2009/0172584 A1* | 7/2009 | Hassan | G06F 8/445 715/772 |
| 2009/0182964 A1* | 7/2009 | Greiner | G06F 12/1009 711/163 |
| 2009/0182966 A1* | 7/2009 | Greiner | G06F 12/10 711/164 |
| 2009/0182971 A1* | 7/2009 | Greiner | G06F 12/1009 711/206 |
| 2009/0182972 A1* | 7/2009 | Greiner | G06F 12/1009 711/206 |
| 2009/0182973 A1* | 7/2009 | Greiner | G06F 9/30043 711/206 |
| 2009/0182974 A1* | 7/2009 | Greiner | G06F 12/109 711/207 |
| 2009/0182975 A1* | 7/2009 | Greiner | G06F 12/1009 711/207 |
| 2009/0187724 A1* | 7/2009 | Greiner | G06F 9/3004 711/164 |
| 2009/0187728 A1* | 7/2009 | Greiner | G06F 9/30054 711/206 |
| 2009/0187732 A1* | 7/2009 | Greiner | G06F 12/1009 711/208 |
| 2009/0193214 A1* | 7/2009 | Greiner | G06F 9/30043 711/166 |
| 2009/0198972 A1* | 8/2009 | Nystad et al. | 712/220 |
| 2009/0210665 A1* | 8/2009 | Bradford | G06F 9/3814 712/215 |
| 2009/0213128 A1* | 8/2009 | Chen | G06F 8/443 345/503 |
| 2009/0249033 A1* | 10/2009 | Greenhalgh | G06F 9/30149 712/205 |
| 2010/0077182 A1* | 3/2010 | Gonion | G06F 9/30036 712/216 |
| 2010/0149185 A1* | 6/2010 | Capewell et al. | 345/426 |

(56) References Cited

U.S. PATENT DOCUMENTS

| | | | |
|---|---|---|---|
| 2010/0153690 A1* | 6/2010 | Vick | G06F 9/30123 712/217 |
| 2010/0153776 A1* | 6/2010 | Vick | G06F 9/30123 714/15 |
| 2010/0161948 A1* | 6/2010 | Abdallah | G06F 9/30043 712/228 |
| 2010/0262806 A1* | 10/2010 | Doing | G06F 9/322 712/205 |
| 2010/0269102 A1* | 10/2010 | Latorre | G06F 9/3842 717/130 |
| 2010/0274972 A1* | 10/2010 | Babayan | G06F 9/3842 711/125 |
| 2010/0274993 A1* | 10/2010 | Golla | G06F 9/30109 712/216 |
| 2011/0067014 A1* | 3/2011 | Song | G06F 8/456 717/149 |
| 2011/0125986 A1* | 5/2011 | Reid | 712/203 |
| 2011/0131396 A1* | 6/2011 | May | G06F 9/30076 712/227 |
| 2011/0197179 A1* | 8/2011 | Kratochvil | G06F 11/3664 717/125 |
| 2011/0222552 A1* | 9/2011 | Mital | G06F 9/3851 370/412 |
| 2011/0265068 A1* | 10/2011 | Elnozahy | G06F 8/456 717/149 |
| 2011/0289297 A1* | 11/2011 | Koehl | G06F 9/3855 712/42 |
| 2012/0047343 A1* | 2/2012 | Farrell | G06F 11/0712 711/164 |
| 2012/0179924 A1* | 7/2012 | Sugiyama | G06F 1/32 713/320 |
| 2012/0204007 A1* | 8/2012 | Reid | G06F 9/30069 712/208 |
| 2012/0223947 A1* | 9/2012 | Nystad et al. | 345/426 |
| 2012/0260065 A1* | 10/2012 | Henry | G06F 9/30025 712/41 |
| 2012/0265969 A1* | 10/2012 | Alexander | G06F 9/30098 712/220 |
| 2012/0278595 A1* | 11/2012 | Indukuru | G06F 9/3853 712/219 |
| 2012/0297168 A1* | 11/2012 | Chen | G06F 9/3838 712/206 |
| 2013/0038620 A1* | 2/2013 | Hakura | G06T 1/20 345/582 |
| 2013/0067202 A1* | 3/2013 | Henry | G06F 9/30076 712/220 |
| 2013/0080737 A1* | 3/2013 | Reid | G06F 8/45 712/4 |
| 2013/0089109 A1* | 4/2013 | Mital | H04L 69/22 370/431 |
| 2013/0125097 A1* | 5/2013 | Ebcioglu | G06F 17/5045 717/136 |
| 2013/0179665 A1* | 7/2013 | Jackson | G06F 9/384 712/228 |
| 2013/0205123 A1* | 8/2013 | Vorbach | G06F 9/30043 712/221 |
| 2013/0212358 A1* | 8/2013 | Tran | G06F 9/30094 712/208 |
| 2013/0339595 A1* | 12/2013 | Kumar | G06F 13/14 711/105 |
| 2014/0156973 A1* | 6/2014 | Suzuki | G06F 9/322 712/205 |
| 2014/0164743 A1* | 6/2014 | Giroux | G06F 9/30145 712/220 |
| 2014/0169378 A1* | 6/2014 | Shumsky | H04L 49/552 370/394 |
| 2014/0184623 A1* | 7/2014 | Frascati | G06T 1/20 345/522 |
| 2014/0189253 A1* | 7/2014 | Mohandru | G06F 9/3834 711/146 |
| 2014/0189312 A1* | 7/2014 | Tan | G06F 9/3881 712/214 |
| 2014/0192815 A1* | 7/2014 | Shumsky | H04L 47/6215 370/394 |
| 2014/0195775 A1* | 7/2014 | Ould-Ahmed-Vall | G06F 9/30036 712/5 |
| 2014/0201352 A1* | 7/2014 | Bates | G06F 9/4812 709/224 |
| 2014/0201498 A1* | 7/2014 | Ould-Ahmed-Vall | G06F 9/30036 712/4 |
| 2014/0204106 A1* | 7/2014 | Hakura et al. | 345/543 |
| 2014/0208074 A1* | 7/2014 | Babayan | G06F 9/3851 712/206 |
| 2014/0229953 A1* | 8/2014 | Sevastiyanov | G06F 9/4881 718/102 |
| 2014/0229955 A1* | 8/2014 | Holmes | G06F 9/4881 718/102 |
| 2014/0281402 A1* | 9/2014 | Comparan | G06F 9/30189 712/214 |
| 2014/0281407 A1* | 9/2014 | Astigeyevich | G06F 9/30145 712/216 |
| 2014/0282437 A1* | 9/2014 | Ma | G06F 8/52 717/136 |
| 2014/0285500 A1* | 9/2014 | Lindholm | G06T 1/20 345/506 |
| 2014/0310696 A1* | 10/2014 | Vorbach | G06F 17/5054 717/151 |
| 2014/0316761 A1* | 10/2014 | Thach | G06F 9/455 703/22 |
| 2014/0317386 A1* | 10/2014 | Vanderspek | G06F 8/433 712/216 |
| 2014/0331236 A1* | 11/2014 | Mitra | G06F 15/7867 718/105 |
| 2014/0359253 A1* | 12/2014 | Gonion | G06F 9/3836 712/9 |
| 2015/0006496 A1* | 1/2015 | Rajwar | G06F 9/467 707/703 |
| 2015/0026442 A1* | 1/2015 | Giroux | G06F 9/3836 712/233 |
| 2015/0039841 A1* | 2/2015 | Hughes | G06F 9/526 711/152 |
| 2015/0074675 A1* | 3/2015 | Qi | G06F 8/443 718/103 |
| 2015/0095625 A1* | 4/2015 | Hassanein | G06F 9/30181 712/226 |
| 2015/0161382 A1* | 6/2015 | Boivie | G06F 21/53 726/28 |
| 2015/0169851 A1* | 6/2015 | Boivie | G06F 11/362 713/167 |
| 2015/0178087 A1* | 6/2015 | Gonion | G06F 9/3838 712/216 |
| 2015/0186227 A1* | 7/2015 | Kolassery | G06F 11/167 714/763 |
| 2015/0208095 A1* | 7/2015 | Schierl | H04N 19/70 375/240.28 |
| 2015/0220342 A1* | 8/2015 | Glossner | G06F 9/3822 712/216 |
| 2015/0220346 A1* | 8/2015 | Wang | G06F 9/3826 712/208 |
| 2015/0220347 A1* | 8/2015 | Glossner | G06F 9/3851 712/215 |
| 2015/0227368 A1* | 8/2015 | Gonion | G06F 9/30036 712/7 |
| 2015/0227369 A1* | 8/2015 | Gonion | G06F 9/30036 712/7 |
| 2015/0242208 A1* | 8/2015 | Busaba | G06F 9/268 712/231 |
| 2015/0277925 A1* | 10/2015 | Sleiman | G06F 9/3851 712/215 |
| 2015/0286472 A1* | 10/2015 | Lim | G06F 8/443 717/151 |
| 2015/0294095 A1* | 10/2015 | Boivie | G06F 21/32 726/19 |
| 2015/0301831 A1* | 10/2015 | Iyer | G06F 9/3851 712/214 |

(56) References Cited

U.S. PATENT DOCUMENTS

| | | | |
|---|---|---|---|
| 2016/0085557 A1* | 3/2016 | Suzuki | G06F 9/3851 712/215 |
| 2016/0092219 A1* | 3/2016 | Morrow | G06F 9/30043 712/221 |
| 2016/0092236 A1* | 3/2016 | Kanapathipillai | G06F 9/3842 712/216 |
| 2016/0110200 A1* | 4/2016 | Carlson | G06F 9/3867 712/215 |
| 2016/0110201 A1* | 4/2016 | Carlson | G06F 9/3826 712/215 |
| 2016/0132329 A1* | 5/2016 | Gupte | G06F 9/4887 718/103 |
| 2016/0139927 A1* | 5/2016 | Gschwind | G06F 9/30101 712/213 |
| 2016/0139928 A1* | 5/2016 | Gschwind | G06F 9/382 712/220 |
| 2016/0154631 A1* | 6/2016 | Cruse | G06N 99/005 717/104 |
| 2016/0162406 A1* | 6/2016 | Latorre | G06F 9/528 711/122 |
| 2016/0217016 A1* | 7/2016 | Raman | G06F 9/4806 |
| 2016/0224349 A1* | 8/2016 | Ge | G06F 9/3822 |
| 2016/0313984 A1* | 10/2016 | Meixner | G06F 8/451 |
| 2016/0313991 A1* | 10/2016 | Wei | G06F 8/452 |
| 2016/0350120 A1* | 12/2016 | Col | G06F 9/30043 |
| 2016/0357554 A1* | 12/2016 | Caulfield | G06F 9/3836 |
| 2016/0371810 A1* | 12/2016 | Havlir | G06T 1/20 |
| 2016/0378473 A1* | 12/2016 | Doshi | G06F 9/30029 712/208 |
| 2016/0378491 A1* | 12/2016 | Burger | G06F 9/3802 712/1 |
| 2017/0024219 A1* | 1/2017 | Abdallah | G06F 9/3838 |
| 2017/0024848 A1* | 1/2017 | Harris | G06F 9/38 |
| 2017/0046160 A1* | 2/2017 | Seth | G06F 9/384 |
| 2017/0060579 A1* | 3/2017 | Vincent | G06F 9/3836 |
| 2017/0083329 A1* | 3/2017 | Burger | G06F 9/3004 |
| 2017/0083334 A1* | 3/2017 | Burger | G06F 9/3004 |
| 2017/0083341 A1* | 3/2017 | Burger | G06F 9/3004 |
| 2017/0083431 A1* | 3/2017 | Burger | G06F 9/3004 |
| 2017/0090756 A1* | 3/2017 | Sato | G06F 3/061 |
| 2017/0153892 A1* | 6/2017 | Linsky | G06F 9/30029 |
| 2017/0153896 A1* | 6/2017 | Mathew | G06F 9/30145 |
| 2017/0161075 A1* | 6/2017 | Titov | G06F 9/3836 |
| 2017/0277537 A1* | 9/2017 | Grocutt | G06F 9/30036 |
| 2017/0277541 A1* | 9/2017 | Chadha | G06F 9/384 |
| 2017/0286202 A1* | 10/2017 | Barrick | G06F 11/0724 |
| 2017/0287100 A1* | 10/2017 | Liktor | G06T 1/20 |
| 2017/0315814 A1* | 11/2017 | Smith | G06F 9/3017 |
| 2017/0344366 A1* | 11/2017 | Beard | G06F 9/3004 |
| 2017/0344367 A1* | 11/2017 | Beard | G06F 12/0875 |
| 2017/0344480 A1* | 11/2017 | Beard | G06F 12/0833 |
| 2017/0371660 A1* | 12/2017 | Smith | G06F 9/30043 |
| 2018/0018172 A1* | 1/2018 | Rouban | G06F 9/30025 |
| 2018/0143832 A1* | 5/2018 | Nield | H03M 7/702 |

FOREIGN PATENT DOCUMENTS

| | | |
|---|---|---|
| CN | 101647000 A | 2/2010 |
| EP | 2141586 A1 | 1/2010 |
| JP | 2010522940 A | 7/2010 |
| JP | 2011514592 A | 5/2011 |
| JP | 2012216009 A | 11/2012 |
| WO | WO2008/027823 | 3/2008 |
| WO | 2013048367 A9 | 4/2013 |

OTHER PUBLICATIONS

Smith, "AMD's Graphic Core Next Preview: AMD's New GPU, Architected for Compute," Dec. 21, 2011, Available at: www.anandtech.com/print/4455/amds-graphics-core-next-preview-and-arthitects-for-compute.

GeForce GTX 480, Architecture, NVIDIA Corporation 2013, available at: http://www.geforce.co.uk/hardware/desktop-gpus/geforce-gtx-480/architecture.

Office Action dated Apr. 27, 2018 in Chinese Patent Application No. 201410239143.8.

Office Action dated Jun. 4, 2018 in Japanese Patent Application No. 2014-111029.

\* cited by examiner

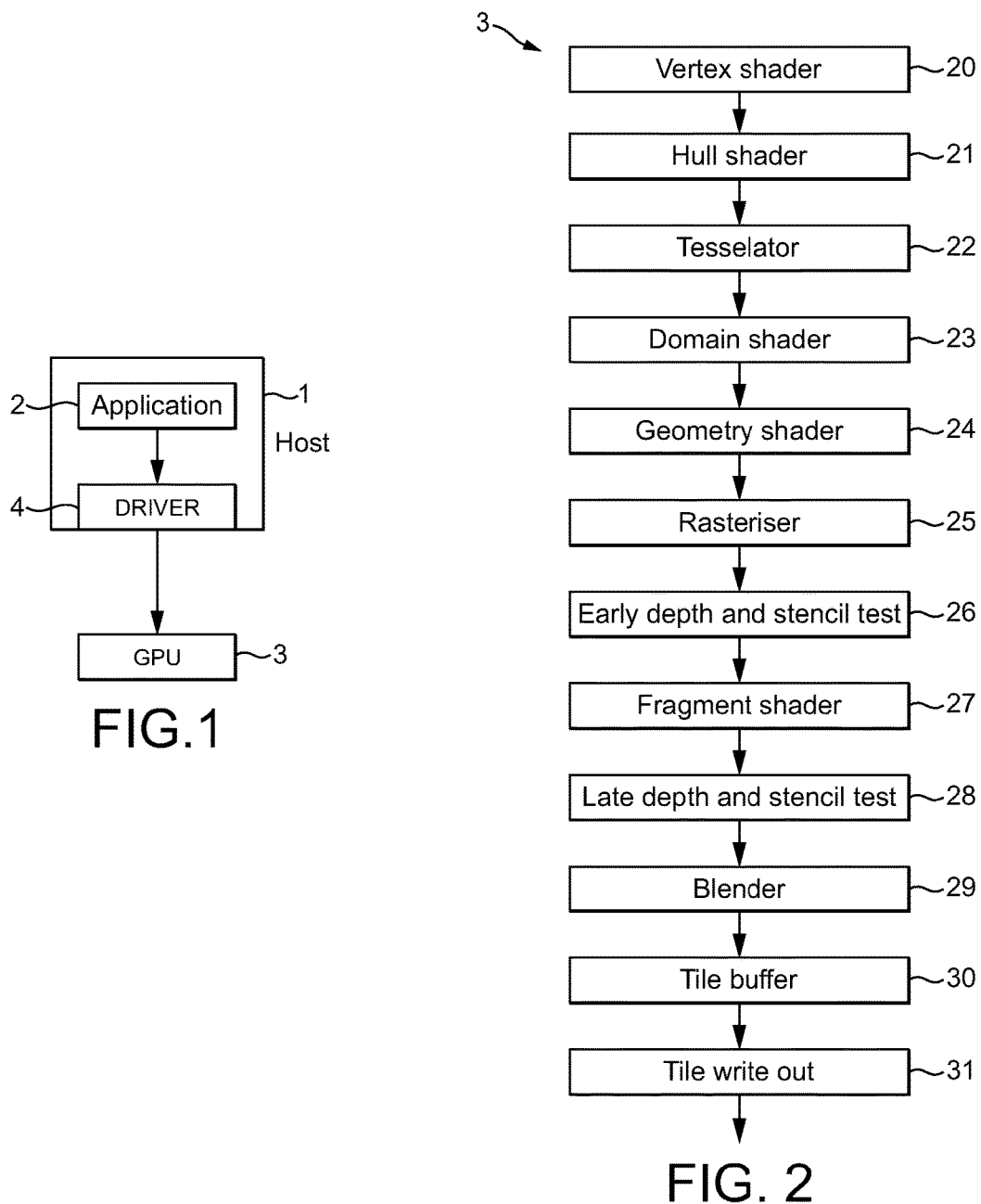

Simple instruction sequence with explicit scoreboard

| |
|---|
| 1: LD R0, [address], using scoreboard entry 0 |
| 2: MOV R1, 5 |
| 3: ADD R2, R0, R1, depends on scoreboard entry 0 |

Simple instruction sequence annotated with explicit scoreboard

| 1: LD R0, [address], using scoreboard entry 0 |
|---|

| Scoreboard | Notes |
|---|---|
| 0: 1 operation pending<br>1:<br>2: | The load is started, but takes a long time to complete due to cache miss |

| 2: MOV R1, 5 |
|---|

| Scoreboard | Notes |
|---|---|
| 0: 1 operation pending<br>1:<br>2: | The move is started and will complete immediately. The load has not yet completed |

| ~~3: ADD R2, R0, R1, depends on scoreboard entry 0~~ |
|---|

| Scoreboard | Notes |
|---|---|
| 0: 1 operation pending<br>1:<br>2: | The load has not yet completed. The ADD cannot execute until the load completes |

| 3: ADD R2, R0, R1, depends on scoreboard entry 0 |
|---|

| Scoreboard | Notes |
|---|---|
| 0:<br>1:<br>2: | The load completes, and the ADD can be issued |

FIG. 4

Simple instruction sequence with explicit scoreboard; annotate
dependencies on previous instruction 1: LD R0, [address], using scoreboard entry 0
2: MOV R1, 5, next instruction depends on scoreboard entry 0
3: ADD R2, R0, R1

Simple instruction sequence annotated with explicit scoreboard

1: LD R0, [address], using scoreboard entry 0

| Scoreboard | Notes |
|---|---|
| 0: 1 operation pending<br>1:<br>2: | The load is started, but takes a long time to complete due to a cache miss |

2: MOV R1, 5, next instruction depends on scoreboard entry 0

| Scoreboard | Notes |
|---|---|
| 0: 1 operation pending<br>1:<br>2: | The load has not yet completed. The next instruction cannot be executed until the load completes |

< next instruction depends on scoreboard entry 0 >

| Scoreboard | Notes |
|---|---|
| 0: 1 operation pending<br>1:<br>2: | The load has not yet completed. The next instruction cannot be executed until the load completes |

3: ADD R2, R0, R1

| Scoreboard | Notes |
|---|---|
| 0:<br>1:<br>2: | The load completes, and the ADD can be issued |

FIG. 5

Write ordering with explicit scoreboard

| 1: ST[address 0], R0, using scoreboard entry 0 | Scoreboard |
|---|---|
| | 0: 1 operation pending |
| | 1: |
| | 2: |

| 2: ST[address 1], R1, using scoreboard entry 1 | Scoreboard |
|---|---|
| | 0: 1 operation pending |
| | 1: 1 operation pending |
| | 2: |

| 3: ST[address 2], R2, using scoreboard entry 1 | Scoreboard |
|---|---|
| | 0: 1 operation pending |
| | 1: 2 operations pending |
| | 2: |

| 4: ~~ST[address 3], R3, using scoreboard entry 2, depends on scoreboard entry 1~~ | Scoreboard |
|---|---|
| | 0: 1 operation pending |
| | 1: 2 operations pending |
| | 2: |

| 4: ~~ST[address 3], R3, using scoreboard entry 2, depends on scoreboard entry 1~~ | Scoreboard |
|---|---|
| | 0: 1 operation pending |
| | 1: 1 operation pending |
| | 2: |

| 4: ST[address 3], R3, using scoreboard entry 2, depends on scoreboard entry 1 | Scoreboard |
|---|---|
| | 0: 1 operation pending |
| | 1: |
| | 2: 1 operation pending |

FIG. 6

Scoreboard branch instruction

```
1: LD R0, [address 0], using scoreboard entry 0
2: LD R1, [address 1], using scoreboard entry 1
3: BRANCH (scoreboard entry 0 done), @7, depends on scoreboard entry 0 OR 1
4: <use R1>
5: <use R0, depends on scoreboard entry 0>
6: JUMP @9
7: <use R0>
8: <use R1, depends on scoreboard entry 1>
9: done
```

Scoreboard branch instruction flow chart

DATA PROCESSING SYSTEMS

BACKGROUND

The technology described herein relates to data processing systems, and in particular to the operation of graphics processing systems that include one or more programmable processing stages ("shaders").

As is known in the art, graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are programmable processing stages that execute shader programs on input data values to generate a desired set of output data (e.g. appropriately transformed and lit vertex data in the case of a vertex shader) for processing by the rest of the graphics pipeline and/or for output. The shaders of the graphics processing pipeline may share programmable processing circuitry, or they may each be distinct programmable processing units.

A graphics processing unit (GPU) shader core is thus a processing unit that performs graphics processing by running small programs for each graphics item in a graphics output to be generated such as a render target, e.g. frame (an "item" in this regard is usually a vertex or a fragment (pixel)). This generally enables a high degree of parallelism, in that a typical render output, e.g. frame, features a rather large number of vertices and fragments, each of which can be processed independently.

As is known in the art, a shader program to be executed by a given "shader" of a graphics processing pipeline will be provided by the application that requires the graphics processing using a high-level shader programming language, such as GLSL, HLSL, OpenCL, etc. This shader program will consist of "expressions" indicating desired programming steps defined in the relevant language standards (specifications). The high-level shader program is then translated by a shader language compiler to binary code for the target graphics processing pipeline. This binary code will consist of "instructions" which are specified in the instruction set specification for the given target graphics processing pipeline. The compilation process for converting the shader language expressions to binary code instructions may take place via a number of intermediate representations of the program within the compiler, as is known in the art. Thus the program written in the high-level shader language may be translated into a compiler specific intermediate representation (and there may be several successive intermediate representations within the compiler), with the final intermediate representation being translated into the binary code instructions for the target graphics processing pipeline.

A known way to improve shader execution efficiency is to group execution threads (where each thread corresponds to one vertex or one fragment (pixel)) into "groups" or "bundles" of threads, where the threads of one group are run in lockstep, one instruction at a time. This way, it is possible to share instruction fetch and scheduling resources between all the threads in the group. (Other terms used for such thread groups include "warps" and "wavefronts". For convenience the term thread group will be used herein, but this is intended to encompass all equivalent terms and arrangements, unless otherwise indicated.)

Execution units in a thread group architecture are typically deeply pipelined. They are normally kept at high utilization by alternating execution between multiple thread groups on a per-clock-cycle basis.

In existing thread group architectures, execution of instructions in a group is done in a strictly in-order manner: once a thread group has begun executing an instruction, it cannot proceed to the next instruction until the current instruction has completed.

This is not normally a problem for arithmetic instructions, as these typically have fairly short latencies. The GPU normally has more than enough thread groups in flight to keep up utilization for arithmetic-only code fairly well.

However, it can be much more of a problem for instructions with nondeterministic latency. Examples of such instructions include: memory accesses (loads, stores and atomics) and texture lookups. Memory accesses may have low latency in case of a cache hit, but tend to exhibit quite high latencies in case of cache misses. This is particularly the case for loads and atomics (for stores, it is often possible to mask latency by performing write gathering). Texture lookups tend to feature memory accesses with relatively high cache miss rates, as well as a large number of fixed-function processing stages both before and after the memory accesses.

In an in-order thread group-based architecture, a few cache misses can easily cause most or even all of the thread groups to get blocked while waiting for the cache misses to get resolved. This is sometimes also aggravated by multiple thread groups producing cache misses for the same memory region.

Also, due to the lockstep execution of threads, it is possible to get multiple cache misses for a single thread group instruction. This happens when the individual threads in a group get cache misses in different cache lines. In this case, the group cannot proceed until all the cache misses have been resolved, which may take a long time.

There sometimes also arises a "bunching" phenomenon, where large groups of thread groups form a "bunch". This "bunch" then tends to move as a whole between different types of execution units with the result that the execution unit currently occupied by the "bunch" is executing at full rate while other execution units stand idle. The actual execution units that stand idle then shift around while the "bunch" executes. This gives fairly poor execution unit utilization.

The Applicants believe therefore that there remains scope for improvements to the handling of thread groups, for example in graphics processing pipelines that include one or more shader stages.

BRIEF DESCRIPTION OF THE DRAWINGS

A number of embodiments of the technology described herein will now be described by way of example only and with reference to the accompanying drawings, in which:

FIG. 1 shows an exemplary computer graphics processing system;

FIG. 2 shows schematically a graphics processing pipeline that can be operated in the manner of the technology described herein;

FIGS. 4 to 7 further illustrate the operation of embodiments of the technology described herein.

DETAILED DESCRIPTION

Figure 3A:
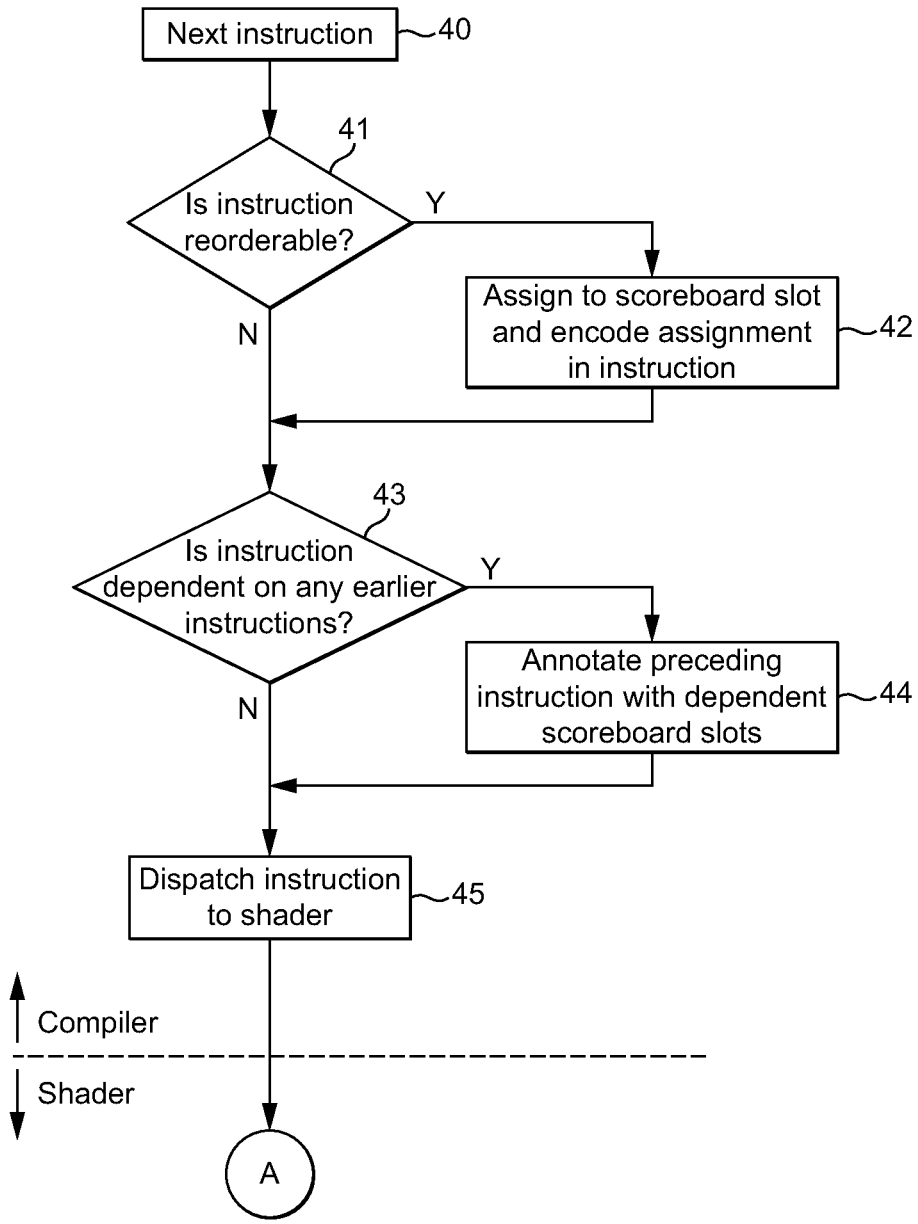
FIGS. 3A and 3B show schematically an embodiment of the operation of the graphics processing system of FIG. 1.

A first embodiment of the technology described herein comprises a method of operating a data processing system which includes an execution pipeline that includes one or more programmable execution stages which execute instructions to perform data processing operations, the method comprising:
  determining for a stream of instructions to be executed by an execution stage, whether there are any instructions that can be re-ordered in the instruction stream;
  assigning each instruction that it has been determined can be re-ordered in the instruction stream to an instruction completion tracker and including in the encoding for the instruction an indication of the instruction completion tracker it has been assigned to;
  for each instruction in the instruction stream that is dependent on an instruction that has been assigned to an instruction completion tracker, providing in the instruction stream an indication of which instruction completion tracker or trackers the instruction that is dependent on an instruction that has been assigned to an instruction completion tracker depends on;
  dispatching instructions in the instruction stream to the execution stage for execution; and
  when executing the instructions in the instruction stream:
  tracking the completion of the instructions using the assigned instruction completion trackers; and
  for any instruction that is indicated as being dependent on an instruction completion tracker, checking the status of that instruction completion tracker before executing the instruction.

A second embodiment of the technology described herein comprises a data processing system comprising:
  an execution pipeline that includes one or more programmable execution stages that execute instructions to perform data processing operations; and
    a compiler that compiles programs for the execution pipeline to generate instructions for execution stages of the execution pipeline;
  wherein:
  the compiler is configured to:
  determine for a stream of instructions to be executed by an execution stage of the execution pipeline, whether there are any instructions that can be re-ordered in the instruction stream;
  assign each instruction that it has been determined can be re-ordered in the instruction stream to an instruction completion tracker and include in the encoding for the instruction an indication of the instruction completion tracker it has been assigned to; and
  for each instruction in the instruction stream that is dependent on an instruction that has been assigned to an instruction completion tracker, providing in the instruction stream an indication of which instruction completion tracker or trackers the instruction that is dependent on an instruction that has been assigned to an instruction completion tracker depends on;
  and wherein:
  at least one execution stage of the execution pipeline is configured to, when executing the instructions in the instruction stream from the compiler:
  track the completion of the instructions using the assigned instruction completion trackers; and
  for any instruction that is indicated as being dependent on an instruction completion tracker, check the status of that instruction completion tracker before executing the instruction.

The technology described herein relates to the execution of instruction streams (sequences) in a data processing pipeline. However, in the technology described herein, instructions in the instruction stream for an execution stage that can be re-ordered in the instruction stream (i.e. instructions that will be allowed to execute out of order) are identified and their completion then tracked, and the dependencies of the instructions in the instruction stream, if any, on the so-identified instructions is encoded in the instruction stream. As will be discussed further below, this then facilitates instructions in a given instruction sequence (stream) being executed out of order (where that is possible) whilst still ensuring that any required instruction dependencies can be enforced. This can then avoid or at least reduce the problems identified above, e.g. relating to the execution of instructions in a thread group in a strictly in order manner.

As discussed above, it is believed that the technology described herein will have particular application in graphics processing systems. Thus the data processing system in an embodiment comprises a graphics processing system, the execution pipeline in an embodiment comprises a graphics processing pipeline, and the execution stages in an embodiment comprise one or more programmable graphics shading stages (shaders) which execute graphics shader programs to perform graphics processing operations. However, the technology described herein is equally applicable to other forms of data processing system, such as in CPUs, such as in scalar or super-scalar CPU pipelines, where similar issues may arise.

Similarly, as discussed above, it is believed that the technology described herein will have particular application in data processing systems in which execution threads may be grouped together into thread groups in which the threads of the group are executed in lockstep, one instruction at a time. Thus, the data processing system, e.g. graphics processing system, is in an embodiment one in which execution threads may be grouped together into thread groups in which the threads of the group are executed in lockstep, one instruction at a time, and the stream of instructions to be executed by an execution stage is in an embodiment a stream (sequence) of instructions to be executed by a thread group.

The instructions in the instruction stream that can be re-ordered may be any suitable and desired instructions. In an embodiment there is set of particular, selected instruction types that can be re-ordered (and so it is determined if any instructions of the particular type or types are present in the instruction stream). In an embodiment, the "reorderable" instructions (i.e. the instructions that are allowed to execute out of order) comprise one or more of, and in an embodiment all of: memory loads, memory stores, memory atomics, attribute interpolation and texture lookups.

The instruction completion trackers can be implemented in any desired and suitable manner. In an embodiment, each tracker comprises a counter that is used to track the completion of the instructions. In an embodiment the counter is incremented when an instruction being tracked by that counter is dispatched to the appropriate execution unit, and then decremented when the instruction actually completes. In this case, a count of "0" will indicate that all instructions currently being tracked by the counter in question have completed (and a count greater than zero will indicate the number of outstanding operations for that tracker).

An instruction tracker may have a set number of instructions that it can track at any one time (e.g. a maximum count value). This could be as small as one instruction and could be different for different trackers. If the maximum number of instructions for a tracker has been reached, then any new instructions that are to use that tracker in an embodiment cause the thread group to stall (until the tracker can track new instructions).

The number of instruction completion trackers can be selected as desired. There could, for example, be only one instruction completion tracker for an execution unit and/or a thread group, but in an embodiment there are plural instruction completion trackers for an execution stage and/or thread group, for example 2, 4, or 8 instruction completion trackers. For example, there may be one tracker for load operations and one for store operations, or plural trackers for each of load and store operations, etc.

Thus, there is in an embodiment a set of instruction completion trackers, e.g. for a (and for each) thread group, comprising a set of counters for the, e.g. thread group. This effectively therefore provides a "scoreboard" that can be used to enforce and track the dependencies of the instructions in the instruction stream, with each tracker (counter) being one "slot" or "entry" in the scoreboard.

The relevant data (data structures for the scoreboard) (the count values) can be stored as desired, e.g. in an appropriate region of pipeline memory.

When an instruction that can be re-ordered is identified, it is assigned to an instruction completion tracker. This assignment is in an embodiment done in a similar way to register allocation. For example, where there are two or more loads that are independent of each other, it may be desirable to assign each load to a different completion tracker, so that there is no need to wait for both loads to complete before instructions that are dependent on only one of the loads can be executed. In general, the system can assign instructions to completion trackers to facilitate more efficient operation as desired.

The instruction completion tracker that an instruction has been assigned to is indicated in (included in) the instruction coding itself. In an embodiment there is a field in the instruction encoding that specifies which instruction tracker the instruction has been assigned to. This indication is then used to update the instruction completion tracker (e.g. counter) as the instruction is dispatched and executed.

As well as identifying re-orderable instructions in the instruction stream, an indication is provided for each instruction in the instruction stream of which instruction completion trackers, if any, the instruction depends on (i.e. in effect of the dependency of the instruction on other instructions in the instruction stream). This indication is included with the instruction stream, in an embodiment as part of the instruction coding (e.g. in a field of an instruction). This indication could be encoded with the instruction to which it relates (i.e. that depends on the instruction (operation) in question), but in an embodiment it is indicated in (encoded with) the immediately preceding instruction in the instruction stream. This may then allow instruction fetch for the dependent instruction to be withheld based on the instruction completion tracking information. This can help to reduce power consumption.

When an instruction is to be executed, the indicated instruction completion tracker dependency for the instruction is first checked. In an embodiment if all the relevant instruction completion trackers indicate that all the instructions they are tracking have been completed (e.g. have count values of "0"), the instruction is executed, but if any of the relevant instruction completion trackers indicate that there are outstanding instructions (e.g. have a count value greater than zero), then the execution of the instruction is withheld (stalled) until all the relevant instruction completion trackers indicate that all the instructions they are tracking have been completed. Instructions can be stalled as desired, with the pipeline, e.g., then executing an unrelated thread group instead.

This arrangement allows data dependencies where they truly exist in the instruction stream to be enforced, whilst still facilitating the out of order execution of instructions where that is possible.

It will be appreciated from the above, that the technology described herein effectively provides a "scoreboarding" arrangement for tracking and enforcing dependencies in the instruction stream. However, unlike in conventional scoreboarding systems, the scoreboarding in the technology described herein is "explicit", in that the existence and function of the scoreboard is exposed in the instruction coding (the dependencies, etc., are marked in the actual executable code). This removes, for example, any need for the execution stages (units) to perform any dependency determinations themselves, thereby reducing power consumption, for example, and allows, e.g., the compiler to set the instructions that have dependencies.

In an embodiment, a "fence" instruction can be included in (added to) the instruction stream that forces all the instructions of a given type or type in the stream before the "fence" instruction to be completed before any instructions after the "fence" instruction are executed. This can then be used to ensure that groups of instructions within the instruction stream are executed in order. In this case, the "fence" instruction could, e.g., relate to one type of instruction only, e.g. to load instructions or to store instructions, or to more than one type of instruction, e.g. to both load and store instructions. Such "fence" instructions could be implemented by means of a load and store instruction that is indicated as being dependent on all the instruction completion trackers (for a load and store "fence"), a load instruction that is indicated as being dependent on all the instruction completion trackers that are being used to track previous load instructions (for a load "fence"), etc.

In an embodiment, it is also or instead possible for the execution pipeline to implicitly insert such "fence" instructions, e.g. for every load/store issued from the same thread group.

In an embodiment, a "branch" instruction can be included in (added to) the instruction stream that has two (or more) sets of different instruction tracker dependencies associated with it, with the appropriate branch then being taken when one of the sets of instruction tracker dependencies is met. This can then provide a conditional branch mechanism that is triggered when the first one of plural different sets of dependencies in the instruction stream is met. This may be desirable where, for example, there may be two or more instructions waiting for different outstanding instructions to complete, but the waiting instructions can be executed in any order relative to each other. In this case, the branch instruction can then be used to determine which of the waiting instructions is satisfied first (and to then branch to that instruction, with the other instruction then being executed subsequently). In an embodiment, if none of the branch conditions is met when the branch instruction is checked, the branch instruction is stalled until one of the branch conditions is met.

It is believed that such a branch instruction may be new and inventive in its own right.

Thus, another embodiment of the technology described herein comprises a method of operating a data processing system which includes an execution pipeline that includes one or more programmable execution stages which execute program instructions to perform data processing operations, and in which the execution of instructions may be dependent upon the completion of other instructions, the completion of instructions is tracked, and the dependency of instructions that are dependent upon the completion of other instructions for their execution can be associated with the dependent instruction, the method comprising:

including in a stream of instructions to be executed, a conditional branch instruction that has associated with it two or more different sets of instruction dependencies, with each different set of instruction dependencies having a given path in the instruction stream to follow associated with it;

dispatching instructions in the instruction stream to an execution stage for execution; and when executing the conditional branch instruction in the instruction stream, checking the status of the sets of instruction dependencies associated with the instruction, and following a path in the instruction stream on the basis of the check.

Another embodiment of the technology described herein comprises a data processing system comprising:

an execution pipeline that includes one or more programmable execution stages which execute program instructions to perform data processing operations, and in which the execution of instructions may be dependent upon the completion of other instructions, the completion of instructions is tracked, and the dependency of instructions that are dependent upon the completion of other instructions for their execution can be associated with the dependent instruction; and processing circuitry configured to:

include in a stream of instructions to be executed, a conditional branch instruction that has associated with it two or more different sets of instruction dependencies, with each different set of instruction dependencies having a given path in the instruction stream to follow associated with it; and dispatch instructions in the instruction stream to the execution pipeline for execution; and wherein:

the execution pipeline is configured to, when executing the conditional branch instruction in the instruction stream, check the status of the sets of instruction dependencies associated with the instruction, and follow a path in the instruction stream on the basis of the check.

As will be appreciated by those skilled in the art, these embodiments of the technology described herein can include any one or more or all of the features of the technology described herein, as appropriate.

The identification of the instructions that can be re-ordered in the instruction stream, the assignment of an instruction completion tracker (and its inclusion in the encoding for the instruction), and the provision in the instruction stream of an indication of which instruction completion trackers, if any, each instruction depends on, is carried out by a compiler for the execution pipeline. Thus, in the case of a graphics processing system, the shader compiler for the graphics processing pipeline in an embodiment performs this operation. The compiler may, e.g., and in an embodiment does, run on a host processor of the data processing system that includes the execution pipeline (with the execution pipeline then being on another processor, such as a graphics processor, that is associated with the host processor (such that the compiler and the compiled code will run on separate processors within the overall data processing system, e.g. graphics processing system)). However, other arrangements would be possible, such as the compiler running on the same processor as the compiled code, or the compiler being run on a separate processor, such as the program being precompiled on a separate system and being distributed in a compiled form.

The technology described herein also extends to the compiler itself. Thus, another embodiment of the technology described herein comprises a compiler that compiles programs to generate instructions for execution stages of an execution pipeline that includes one or more programmable execution stages that execute instructions to perform data processing operations, wherein the compiler is configured to:

determine for a stream of instructions to be executed by an execution stage of the execution pipeline, whether there are any instructions that can be re-ordered in the instruction stream;

assign each instruction that it has been determined can be re-ordered in the instruction stream to an instruction completion tracker and include in the encoding for the instruction an indication of the instruction completion tracker it has been assigned to; and for each instruction in the instruction stream that is dependent on an instruction that has been assigned to an instruction completion tracker, providing in the instruction stream an indication of which instruction completion tracker or trackers the instruction that is dependent on an instruction that has been assigned to an instruction completion tracker depends on.

Thus, another embodiment of the technology described herein comprises a method of compiling a program to generate instructions for an execution stage of an execution pipeline that includes one or more programmable execution stages that execute instructions to perform data processing operations, the method comprising:

determining for a stream of instructions to be executed by an execution stage of the execution pipeline, whether there are any instructions that can be re-ordered in the instruction stream;

assigning each instruction that it has been determined can be re-ordered in the instruction stream to an instruction completion tracker and including in the encoding for the instruction an indication of the instruction completion tracker it has been assigned to; and for each instruction in the instruction stream that is dependent on an instruction that has been assigned to an instruction completion tracker, providing in the instruction stream an indication of which instruction completion tracker or trackers the instruction that is dependent on an instruction that has been assigned to an instruction completion tracker depends on.

The technology described herein also extends to an execution pipeline having execution stages that can perform out-of-order processing in response to (and using) the instructions of the technology described herein (i.e. without needing to, or having the circuitry to, detect instructions that can be re-ordered themselves).

Thus, another embodiment of the technology described herein comprises an execution pipeline for a data processing system that includes one or more programmable execution stages which execute instructions to perform data processing operations, wherein:

at least one execution stage of the execution pipeline is configured to, when executing instructions in an instruction stream:

in response to an indication in the encoding for an instruction provided by a compiler for the execution stage that the instruction has been assigned to an instruction completion tracker, track the completion of the instruction using the indicated assigned instruction completion tracker; and in response to an indication in the encoding for an instruction provided by a compiler for the execution stage that an instruction in the instruction stream is dependent on an instruction completion tracker, check the status of the indicated instruction completion tracker before executing the instruction that is indicated as being dependent on the instruction completion tracker.

Another embodiment of the technology described herein comprises a method of operating an execution pipeline for a data processing system that includes one or more programmable execution stages which execute instructions to perform data processing operations, the method comprising:

at least one execution stage of the execution pipeline, when executing instructions in an instruction stream:

in response to an indication in the encoding for an instruction provided by a compiler for the execution stage that the instruction has been assigned to an instruction completion tracker, tracking the completion of the instruction using the indicated assigned instruction completion tracker; and in response to an indication in the encoding for an instruction provided by a compiler for the execution stage that an instruction in the instruction stream is dependent on an instruction completion tracker, checking the status of the indicated instruction completion tracker before executing the instruction that is indicated as being dependent on the instruction completion tracker.

As will be appreciated by those skilled in the art, these embodiments of the technology described herein can and in embodiments do include any one or more or all of the features of the technology described herein, as appropriate.

In the case of a graphics processing pipeline, the execution units (stages) in an embodiment comprise programmable, shading stages of the graphics processing pipeline such as the vertex shader, fragment shader, etc. These stages can be implemented as desired and in any suitable manner, and can perform any desired and suitable shading, e.g. vertex shading, fragment shading, etc., functions, respectively and as appropriate. In the case of a fragment shader, for example, the fragment shader may render a primitive or primitives to generate a set of render output values, e.g. representing a frame for display. These output values may then be exported to external memory for storage and use, such as to a frame buffer for a display.

In an embodiment all the execution stages (each execution stage) of the execution pipeline can and does operate in the manner of the technology described herein.

Each programmable processing stage (execution unit) may comprise any suitable programmable hardware element such as programmable processing circuitry. Each programmable processing stage may be provided as a separate circuit element to other programmable stages of the processing pipeline or the programmable processing stages may share some or all of their programmable processing circuitry (that is then differently programmed to serve as the desired programmable processing stage).

As well as the programmable processing (shader) stages, a graphics processing pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processing pipeline may be used to generate, such as frames for display, render-to-texture outputs, etc. The output, e.g. fragment shaded, data values from the graphics processing are in an embodiment exported to external, e.g. main, memory, for storage and use, such as to a frame buffer for a display.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments of the technology described herein can, and in embodiments do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 3 of the present embodiment in more detail.

The graphics processing pipeline 3 shown in FIG. 2 is a tile-based renderer and will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

(As is known in the art, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20, as is known in the art, takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

As is known in the art, the hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates, as is known in the art, to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs, is known in the art, a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer will store, as is known in the art, colour and depth buffers that store an appropriate colour, etc., or Z-value, respectively, for each sampling point that the buffers represent (in essence for each sampling point of a tile that is being processed).) These buffers store, as is known in the art, an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 3 includes a number of programmable processing or "shader" stages, namely the verbex shader 20, hull shader 21, domain shader 23, geometry shader 24, and the fragment shader 27. These programmable shader stages execute respective shader programs that have one or more input variables and generate sets of output variables and that are provided by the application. To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include, as is known in the art, the creation of one or more intermediate representations of the program within the compiler. (The compiler may, e.g., be part of the driver 4, with there being a special API call to cause the compiler to run. The compiler execution can thus be seen as being part of the draw call preparation done by the driver in response to API calls generated by an application).

As discussed above, each shader in the graphics processing pipeline is a processing unit that performs graphics processing by running small programs for each graphics item in a graphics output to be generated (an "item" in this regard is usually a vertex, a fragment or a pixel). The present embodiment relates to the situation where execution threads to be executed by a shader (where each thread corresponds to one graphics item) have been organised into a "group" or "bundle" of threads that are to be run in lockstep, one instruction at a time.

In the present embodiment, a "scoreboarding" arrangement is used to track the dependencies of instructions for a thread group and to allow out of order execution of instructions in a thread group. This is implemented as follows.

The present embodiment uses a scoreboard that supports eight instruction completion trackers (that has eight "scoreboard" entries or slots for each respective thread group). Other numbers of scoreboard entries (slots (instruction completion trackers)) would be possible if desired.

Each of the scoreboard entries (instruction completion trackers) has a counter associated with it. The counters are of limited width and if a counter has reached its maximum value, then attempts at executing a reorderable instruction using that scoreboard slot (counter) causes the associated thread group to stall (until the counter has decreased). The counter width may be as small as one bit. It would also be possible to have different widths for different slots.

The data for the scoreboard (the slot counter values) can be implemented in any suitable way, e.g. stored in suitable pipeline memory.

As the graphics processing pipeline shader compiler executing on the host processor 1 processes the instruction stream for a shader program, it identifies in the instruction stream instructions that are allowed to execute out of order ("reorderable" instructions). In the present embodiment, the "reorderable" instructions that are identified (if present) are: memory loads and stores, attribute interpolation, and texture lookups. Other arrangements would, of course, be possible.

If the compiler identifies a reorderable instruction in the instruction stream, it assigns it to one of the scoreboard slots (entries) (instruction completion trackers) and encodes in a field of the instruction data specifying which one of the scoreboard slots it has been assigned to. This assignment can be done as desired, e.g. depending on the nature of the instruction and the current usage of the scoreboard slots.

When the reorderable instruction is dispatched to the appropriate shader for execution, the indicated scoreboard slot (entry) has its counter incremented (to indicate that there is now an outstanding operation (instruction) associated with that slot). When the instruction actually completes, the slot's counter is correspondingly decremented.

As well identifying reorderable instructions in the instruction stream, the compiler also provides for each instruction in the instruction stream, whether reorderable or not, an annotation that indicate which scoreboard slots (instruction completion trackers), if any, the instruction depends on. This annotation is used to enforce data dependencies when they truly exist in the shader program.

In the present embodiment, this annotation is not actually placed on the instruction that requires the relevant instruction to complete, rather, it is placed on (encoded in) the immediately preceding instruction. This facilitates withholding instruction fetch of the dependent instruction where its dependency has not yet been satisfied.

The instructions are then dispatched to the shader for execution. In the shader, before each instruction is fetched, the counter values for the indicated associated dependency slot(s) (instruction completion tracker(s)) are checked. If all the associated slots all have a counter value of 0 (thus indicating that all instructions that the current instruction is dependent on have completed), the instruction is fetched and executed. If all the associated slots do not have a counter value of 0 (thus indicating that at least some of the instructions that the current instruction is dependent on have not yet completed), then the instruction's fetch (and thus execution) is withheld (using any suitable mechanism) until all the associated slots' counters reach 0.

Figure 3B:
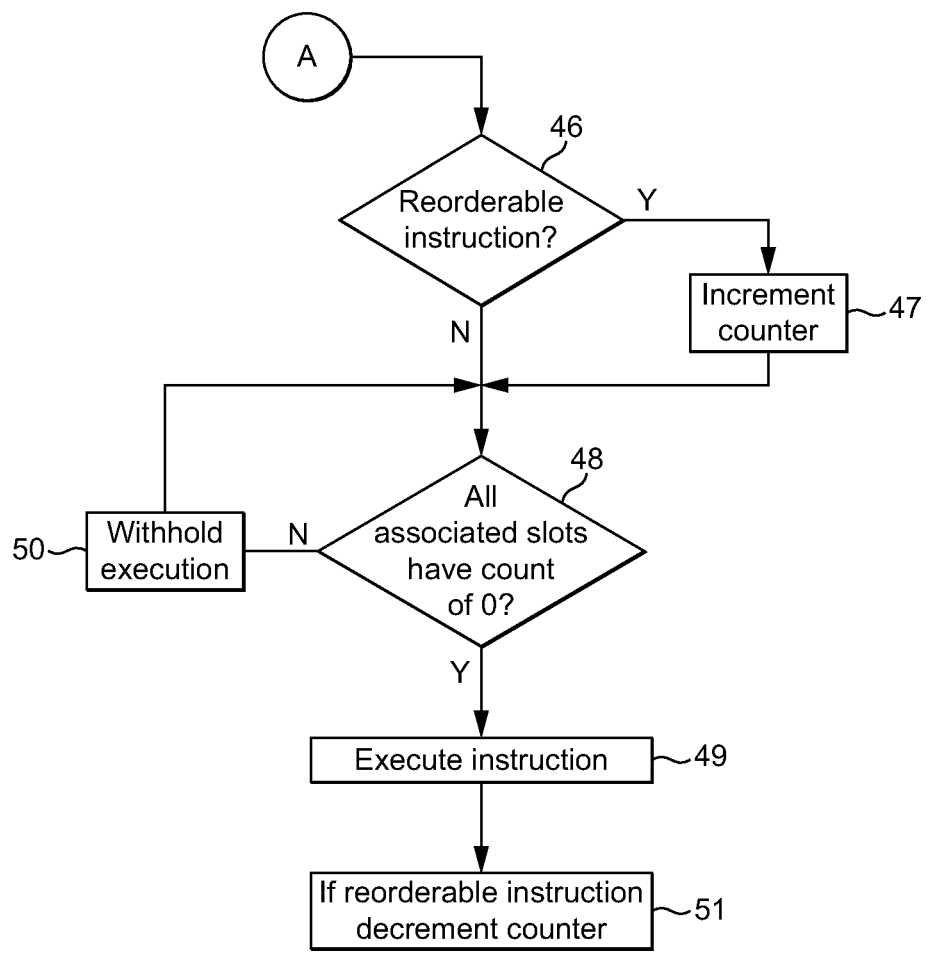

FIGS. 3A and 3B illustrates this process. The compiler, when it reaches an instruction in the instruction stream (step 40), determines if it is a reorderable instruction or not (step 41). If it is, it assigns a scoreboard slot to the instruction and encodes that assignment in the instruction (step 42). If not, no scoreboard slot is assigned.

The compiler then determines if the instruction is dependent on any earlier instructions (step 43) and annotates the preceding instruction with the relevant scoreboard slots for the determined dependencies of the current instruction (if any) (step 44).

The instructions are then dispatched to the shader (step 45). When a reorderable instruction is dispatched, the counter for its associated slot is incremented (steps 46, 47). Correspondingly, when such an instruction completes, the counter is decremented (step 51).

When an instruction is to be executed, the counter values for the dependency slot(s) indicated as being associated with the instruction are checked (step 48). If all the associated slots all have a counter value of 0, the instruction is executed (step 49). If all the associated slots do not have a counter value of 0, then the instruction's execution is withheld until all the associated slots' counters reach 0 (step 50).

FIG. 4 illustrates the scoreboard arrangement that is used in the embodiment of the technology described herein for a short instruction sequence comprising three instructions, a first instruction to load a value from memory into register R0, a second instruction to move a constant value into register R1, and a third instruction to add the content of the registers R0 and R1 placing the result in register R2.

In this case, as shown in FIG. 4, the compiler will identify the first instruction as being a re-orderable instruction and so in this example assigns it to the scoreboard slot (entry) 0. It also identifies the third instruction as being dependent upon the completion of the first instruction (load instruction), and so annotates the third instruction as being dependent upon the scoreboard entry (slot) 0.

The instructions are then dispatched to the pipeline. As shown in FIG. 4, when the first instruction is dispatched, the counter for the scoreboard entry 0 is incremented to show that the load instruction is pending. In this case it is assumed that the load instruction takes a long time to complete due to a cache miss.

The processing then moves on to the second instruction, which can be executed as it is not dependent on any scoreboard slots. The execution unit then attempts to execute the third instruction but determines from the scoreboard entry 0 that the load operation that it is dependent on has still not completed. The third, ADD, instruction cannot therefore execute at this stage. Finally, when the count for scoreboard entry 0 is 0, the third, ADD instruction can execute, the load completes and the ADD can be issued.

FIG. 5 shows the corresponding operation but in which the dependency of the third, ADD instruction is indicated in the encoding for the second, move instruction (as shown in FIG. 5). In this case it is identified when the move instruction is executed that the next instruction depends on the scoreboard entry 0, and so the fetching of the third, ADD, instruction is deferred until the first, load instruction has been completed.

FIG. 6 shows an exemplary operation of the technology described herein to enforce a dependent store operation. In this case there is a sequence of four store instructions in which it is assumed that the fourth store instruction is dependent upon the completion of the second and third store instructions. To facilitate this, as shown in FIG. 6, the second and third store instructions are assigned to the same scoreboard slot (entry), in this case scoreboard entry 1, and the fourth, dependent, store instruction is indicated as being dependent on that scoreboard entry, such that it will only execute once the second and third store instructions have completed. (However, as shown in FIG. 6, the fourth store instruction is not dependent on the first store instruction, and so can be executed even if that first store instruction has not yet completed.)

Various alternatives and additions to the above embodiments would be possible, if desired.

For example, in the above embodiments, no dependency tracking other than what the explicit scoreboarding provides is performed. This then means that in the absence of explicit scoreboard tests, reads, writes and atomics from a thread execute in an arbitrary order relative to each other. This being the case, if the compiler cannot prove that a memory write does not overlap with a previous read or write, then the compiler marks the write as dependent on the previous read-or-write in question. Similarly, if the compiler cannot prove that a memory read does not overlap with a previous write, then the compiler marks the read as dependent on all affected previous writes.

As an alternative to this, in another embodiment, the compiler can insert a "memory fence" instruction in the instruction stream. Such an instruction is an instruction that tells an execution unit (e.g. a load/store unit) to enforce an ordering on the instructions, e.g. from a thread group. For example, all the load/store instructions issued before the fence instruction are required to complete before any of the load/store instructions after the fence. This could be achieved, e.g. by using an instruction that is indicated as being dependent on all the scoreboard "slots". It would also be possible to have a "load fence" instruction that blocks reordering of loads only, and a "store fence" instruction that blocks reordering of stores only.

Another possibility would be to have a load/store pipeline that implicitly inserts such a memory fence for every load/store issued from the same thread group.

The Applicants have recognised that in some cases, the execution unit may be waiting for two or more outstanding items, but which can be processed in an arbitrary order. In order to maximize implementation efficiency for this case, a scoreboard "branch" instruction could be used (inserted into the instruction stream by the compiler when it recognises this situation). This instruction is a conditional branch which tests subsets of the scoreboard slots (entries): if all the scoreboard slots of one subset to be tested have a counter value equal to zero, then the branch is taken, if all the scoreboard slots of the other subset to be tested have a counter value equal to zero, then another branch (path) is taken, otherwise the branch instruction is stalled. The sets of scoreboard slots to test is encoded in the branch instruction itself. Such a scoreboard branch instruction should be annotated with two different sets of dependencies, such that the instruction is executed as soon as at least one of the two sets is satisfied. The branch always takes the same direction for all the threads in a thread group such that it cannot cause thread group divergence.

Figure 7:
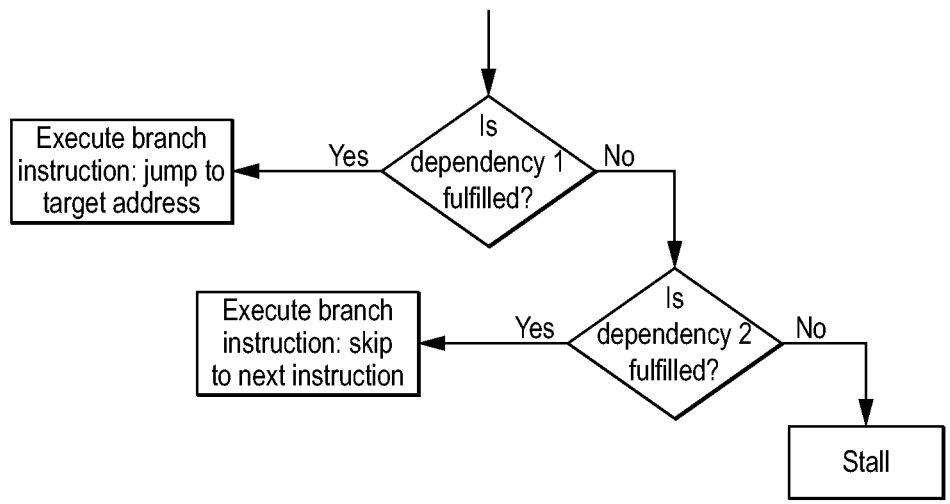

FIG. 7 shows schematically the operation of a scoreboard branch instruction. In this example the branch instruction is the third instruction in the sequence, and is dependent upon scoreboard entry 0 being done (in which case it branches to instruction 7 in the sequence), and has a second dependency subset which is on scoreboard entry 0 or 1 (in which case the execution moves on to the next instruction in the sequence (in this case instruction 4)). If neither branch condition is met, the execution of the branch instruction is stalled.

It can be seen from the above that the technology described herein, in its embodiments at least, provides a mechanism for facilitating out of order execution of instructions for thread groups in, e.g., a thread-group based GPU shader core. This helps to increase the amount of parallelism that can be exploited with a given amount of hardware resources, and thus helps to improve execution unit utilisation.

This is achieved, in embodiments of the technology described herein at least, by using an "explicit" scoreboarding mechanism, in which the instruction dependencies are encoded in the instructions themselves.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system which includes an execution pipeline that includes one or more programmable execution stages which execute instructions to perform data processing operations, the method comprising:

determining for a stream of instructions to be executed by an execution stage, whether there are any instructions that can be re-ordered in the stream of instructions;

assigning each instruction that it has been determined can be re-ordered in the stream of instructions to an instruction completion tracker;

including in an encoding for each instruction that it has been determined can be re-ordered an indication of the instruction completion tracker it has been assigned to, each such instruction comprising an assigned instruction;

for each instruction in the stream of instructions that is dependent on one of the assigned instructions thereby comprising a dependent instruction, providing in the stream of instructions an indication of the instruction completion tracker of the assigned instruction on which the dependent instruction depends;

dispatching instructions in the stream of instructions to the execution stage for execution; and when executing the instructions in the stream of instructions:

tracking completion of execution of the assigned instructions using the instruction completion trackers to which they have been assigned;

for any dependent instruction, before executing the dependent instruction, checking a status of the instruction completion tracker of the assigned instruction on which it is dependent that is indicated in the instruction stream; and when the status of the instruction completion tracker of the assigned instruction on which the depend instruction depends indicates that the assigned instruction has been completed, executing the dependent instruction; and when the status of the instruction completion tracker of the assigned instruction on which the dependent instruction depends indicates that the assigned instruction is outstanding, stalling execution of the dependent instruction until the indicated instruction completion tracker indicates that the assigned instruction has been completed;

wherein each instruction completion tracker comprises a counter that is used to track the completion of an assigned instruction that is being tracked by the counter, wherein the counter is incremented when an assigned instruction being tracked by the counter is dispatched for execution, and wherein the counter is decremented when an assigned instruction being tracked by the counter completes.

2. The method of claim 1, wherein the instructions in the stream of instructions that can be re-ordered comprise: memory loads, memory stores, memory atomics, attribute interpolation and texture lookups.

3. The method of claim 1, wherein for an assigned instruction, the instruction completion tracker that the assigned instruction has been assigned to is indicated in a field in the encoding of the assigned instruction that specifies which instruction completion tracker the assigned instruction has been assigned to.

4. The method of claim 1, wherein the indication provided for a dependent instruction in the stream of instructions of which instruction completion trackers the dependent instruction depends on, is indicated in an immediately preceding instruction in the stream of instructions.

5. The method of claim 1, further comprising including a fence instruction in the stream of instructions that forces all the instructions of a given type or types in the stream before the fence instruction to be completed before instructions after the fence instruction are executed.

6. The method of claim 1, further comprising including a branch instruction in the stream of instructions that has two or more sets of different instruction tracker dependencies associated with it, with a branch then being taken when one of the sets of instruction tracker dependencies is met.

7. The method of claim 1, wherein the data processing system comprises a graphics processing system that includes a graphics processing pipeline that includes one or more programmable shader stages which execute graphics shader programs to perform graphics processing operations.

8. A method of operating a data processing system which includes an execution pipeline that includes one or more programmable execution stages which execute instructions to perform data processing operations, and in which the execution of instructions may be dependent upon the completion of other instructions, each such instruction whose execution is dependent upon the completion of other instructions comprising a dependent instruction having a set of dependencies, wherein instructions to be executed are assigned to instruction completion trackers, the completion of instructions is tracked using the instruction completion trackers to which the instructions have been assigned, each instruction completion tracker comprising a counter that is incremented when an instruction being tracked by the counter is dispatched for execution and that is decremented when an instruction being tracked by the counter completes, and wherein the set of dependencies of dependent instructions can be associated with the dependent instruction;

the method comprising:

identifying in a stream of instructions to be executed two or more dependent instructions, each of the two or more dependent instructions being dependent on a different set of instructions, each set of instructions having an associated set of instruction completion trackers, wherein the identified dependent instructions can be executed in any order relative to each other;

a compiler inserting into the stream of instructions to be executed, a conditional branch instruction that is in addition to the identified two or more dependent instructions, wherein the inserted conditional branch instruction has associated with it two or more different sets of instruction dependencies which are tracked with a respective set of instruction completion trackers, with each different set of instruction dependencies having a given path in the stream of instructions to follow associated with it, wherein each different set of instruction completion trackers comprises the set of instruction completion trackers for a respective one of the identified dependent instructions;

dispatching instructions in the stream of instructions including the conditional branch instruction to an execution stage for execution;

executing instructions in the steam of instructions including the conditional branch instruction;

tracking completion of execution of the different sets of instructions using the associated sets of instruction completion trackers; and when executing the conditional branch instruction in the stream of instructions, checking a status of the sets of instruction completion trackers associated with the conditional branch instruction, executing the conditional branch instruction as soon as at least one of the sets of instruction completion trackers indicates that the associated set of dependencies is met, and following the path in the stream of instructions that is associated with the set of instruction dependencies that has been met.

9. A data processing system comprising:
an execution pipeline that includes one or more programmable execution stages which execute instructions to perform data processing operations; and
a compiler that compiles programs for the execution pipeline to generate a stream of instructions to be executed by an execution stage of the execution pipeline;
wherein:
the compiler is configured to:
determine for the stream of instructions, whether there are any instructions that can be re-ordered in the stream of instructions;
assign each instruction that it has been determined can be re-ordered in the stream of instructions to an instruction completion tracker;
include in an encoding for each instruction that it has been determined can be re-ordered an indication of the instruction completion tracker it has been assigned to, each such instruction comprising an assigned instruction; and
for each instruction in the stream of instructions that is dependent on one of the assigned instructions thereby comprising a dependent instruction, providing in the stream of instructions an indication of the instruction completion tracker of the assigned instruction on which the dependent instruction depends;
and wherein:
at least one execution stage of the execution pipeline is configured to, when executing instructions in the stream of instructions:
track completion of execution of assigned instructions using the instruction completion trackers to which they have been assigned; and
for any dependent instruction, before executing the dependent instruction, check a status of the instruction completion tracker of the assigned instruction on which the dependent instruction depends that is indicated in the instruction stream; and
when the status of the instruction completion tracker of the assigned instruction on which the dependent instruction depends indicates that the assigned instruction has been completed, execute the dependent instruction; and
when the status of the instruction completion tracker of the assigned instruction on which the depend instruction depends indicates that the assigned instruction is outstanding, stall execution of the dependent instruction until the indicated instruction completion tracker indicates that the assigned instruction has been completed;
wherein each instruction completion tracker comprises a counter that is used to track the completion of an assigned instruction that is being tracked by the counter, wherein the counter is incremented when an assigned instruction being tracked by the counter is dispatched for execution, and wherein the counter is decremented when an assigned instruction being tracked by the counter completes.

10. The data processing system of claim 9, wherein the instructions in the stream of instructions that can be re-ordered comprise: memory loads, memory stores, memory atomics, attribute interpolation and texture lookups.

11. The data processing system of claim 9, wherein the instruction completion tracker that an assigned instruction has been assigned to is indicated in a field in the assigned instruction encoding that specifies which instruction tracker the assigned instruction has been assigned to.

12. The data processing system of claim 9, wherein the indication provided for a dependent instruction in the stream of instructions of which instruction completion trackers the dependent instruction depends on, is indicated in an immediately preceding instruction in the stream of instructions.

13. The data processing system of claim 9, wherein the compiler is further configured to include a fence instruction in the stream of instructions that forces all the instructions of a given type or types in the stream before the fence instruction to be completed before instructions after the fence instruction are executed.

14. The data processing system of claim 9, wherein the compiler is further configured to include a branch instruction in the stream of instructions that has two or more sets of different instruction tracker dependencies associated with it, with a branch being taken when one of the sets of instruction tracker dependencies is met.

15. The data processing system of claim 9, wherein the data processing system comprises a graphics processing system that includes a graphics processing pipeline that includes one or more programmable shader stages which execute graphics shader programs to perform graphics processing operations.

16. A compiler comprising programmable processing circuitry that compiles programs to generate instructions for execution stages of an execution pipeline that includes one or more programmable execution stages that execute instructions to perform data processing operations, wherein the compiler is configured to:
determine for a stream of instructions to be executed by an execution stage of the execution pipeline, whether there are any instructions that can be re-ordered in the stream of instructions;
assign each instruction that it has been determined can be re-ordered in the stream of instructions to an instruction completion tracker;
include in an encoding for each instruction that it has been determined can be re-ordered an indication of the instruction completion tracker it has been assigned to, each such instruction comprising an assigned instruction; and
for each instruction in the stream of instructions that is dependent on one of the assigned instructions thereby comprising a dependent instruction, providing in the stream of instructions an indication of the instruction completion tracker of the assigned instruction on which the dependent instruction depends, wherein the completion trackers are for tracking completion of execution of the assigned instructions to which they have been assigned; and
wherein, for any dependent instruction, before executing the dependent instruction, a status of the instruction completion tracker of the assigned instruction on which it is dependent that is indicated in the instruction stream is checked; and
wherein the dependent instruction is executed when the status of the instruction completion tracker of the assigned instruction on which the depend instructions depends indicates that the assigned instruction has been completed; and
wherein when the status of the instruction completion tracker of the assigned instruction on which the dependent instruction depends indicates that the assigned instruction is outstanding, the execution of the dependent instruction is stalled until the indicated instruction completion tracker indicates that the assigned instruction has been completed;

wherein each instruction completion tracker comprises a counter that is used to track the completion of an assigned instruction that is being tracked by the counter, wherein the counter is incremented when an assigned instruction being tracked by the counter is dispatched for execution, and wherein the counter is decremented when an assigned instruction being tracked by the counter completes.

17. A execution pipeline for a data processing system comprising:
   one or more programmable execution stages which execute instructions to perform data processing operations; and in which:
   at least one execution stage of the execution pipeline is configured to, when executing instructions in an stream of instructions:
      in response to an indication in an encoding for an assigned instruction provided by a compiler for the execution stage that the instruction has been assigned to an instruction completion tracker, track completion of execution of the instruction using the indicated assigned instruction completion tracker; and
      in response to an indication in the encoding for an instruction provided by a compiler for the execution stage that a dependent instruction in the stream of instructions is dependent on an instruction completion tracker that one of the assigned instructions on which the dependent instruction depends has been assigned to, check a status of the indicated instruction completion tracker before executing the dependent instruction; and
         when the status of the indicated instruction completion tracker indicates that the assigned instruction has been completed, execute the dependent instruction; and
         when the status of the indicated instruction completion tracker indicates that the assigned instruction is outstanding, stall execution of the dependent instruction is until the indicated instruction completion tracker indicates that the assigned instruction has been completed;
   wherein each instruction completion tracker comprises a counter that is used to track the completion of an assigned instruction that is being tracked by the counter, wherein the counter is incremented when an assigned instruction being tracked by the counter is dispatched for execution, and wherein the counter is decremented when an assigned instruction being tracked by the counter completes.

18. One or more non-transitory processor readable storage devices storing computer software code which when executing on a processor compiles programs to generate instructions for execution stages of an execution pipeline that includes one or more programmable execution stages that execute instructions to perform data processing operations, by:
   determining for a stream of instructions to be executed by an execution stage of the execution pipeline, whether there are any instructions that can be re-ordered in the stream of instructions;
   assigning each instruction that it has been determined can be re-ordered in the stream of instructions to an instruction completion tracker;
   including in the encoding for each instruction that it has been determined can be re-ordered an indication of the instruction completion tracker it has been assigned to, each such instruction comprising an assigned instruction; and
   for each instruction in the stream of instructions that is dependent on one of the assigned instructions thereby comprising a dependent instruction, providing in the stream of instructions an indication of the instruction completion tracker of the assigned instruction on which the dependent instruction depends, wherein the completion trackers are for tracking completion of execution of the assigned instructions to which they have been assigned; and
   wherein, for any dependent instruction, before executing the dependent instruction, a status of the instruction completion tracker of the assigned instruction on which it is dependent that is indicated in the instruction stream is checked; and
   wherein the dependent instruction is executed when the status of the instruction completion tracker of the assigned instruction on which the depend instruction depends indicates that the assigned instruction has been completed; and
   wherein when the status of the instruction completion tracker of the assigned instruction on which the dependent instruction depends indicates that the assigned instruction is outstanding, the execution of the dependent instruction is stalled until the indicated instruction completion tracker indicates that the assigned instruction has been completed;
   wherein each instruction completion tracker comprises a counter that is used to track the completion of an assigned instruction that is being tracked by the counter, wherein the counter is incremented when an assigned instruction being tracked by the counter is dispatched for execution, and wherein the counter is decremented when an assigned instruction being tracked by the counter completes.

* * * * *